United States Patent Office 3,523,032
Patented Aug. 4, 1970

3,523,032
**POLYEPOXIDE WITH IMIDAZOLE PRE-CATA-
LYZED REINFORCEMENT MATERIAL**
Erich F. Kujas, Philadelphia, Pa., assignor to Air Products and Chemicals, Inc., Philadelphia, Pa., a corporation of Delaware
No Drawing. Filed July 26, 1967, Ser. No. 656,049
Int. Cl. B44d *1/092*
U.S. Cl. 117—47                           6 Claims

---

ABSTRACT OF THE DISCLOSURE

Reinforcement material, such as glass fibers, for use in epoxy resin compositions is surface-coated with an imidazole which serves as heat-activable catalyst capable of promoting the curing of curable epoxy resin. The pre-catalyzed reinforcement material is combined with appropriate curable epoxy resin and, without further addition of curing agent, is heat cured to reinforced polyepoxide.

---

BACKGROUND OF THE INVENTION

The present invention relates to the treatment of material which is used as reinforcement for resins. More particularly, the invention relates to the preparation of imidazole pre-catalyzed reinforcement material for use in polyepoxide resin systems.

In recent years, epoxy resins, i.e., the resinous or resin-forming materials which contain one or more epoxide or oxirane group, have come into broad commercial use. While glycidyl ether resins, produced by reacting polyhydroxyl compounds with epichlorohydrin, have been the most prominent members designated by the expression "epoxy resin," significant development has occurred in the utilization of epoxidized olefins which are formed by the addition of oxygen to the double bond to form the three-membered epoxide ring.

Epoxy resins are particularly valued for their ability to remain liquid for a long period of time while being readily convertible upon hardening to materials suitable for use in such applications as filament windings, laminates, electrical insulation, coatings and adhesives. This hardening is obtained by the addition of chemically active curing or hardening agents. Two general types of reactions are involved in producing useful end products:

(1) Cross-linking or coupling reactions, including esterification and etherification; and (2) Catalytic polymerization reactions which occur predominantly by polymerization through the epoxy groups.

It is common practice to use reinforcement material such as glass, boron, asbestos, nylon, polyethylene terephthalate, cotton, etc., in random or woven form as reinforcement for polyepoxides. The purpose of such reinforcement is to increase the strength of the polyepoxides several fold. Since the polyepoxides are usually thick liquids which become hard when cured, they are typically combined with reinforcement material, as well as a catalyst system, within a relatively short period before the polyepoxides are cured. Accordingly, the choice of catalyst is particularly important.

Reinforcement material, particularly glass filaments, can be used in various forms, including: filaments, strands (composed of a multitude of filaments), woven fabrics, non-woven mattings, bulk chopped fibers, unidirectional rovings, etc. Fabrics are used where rather high strengths are required. Such fabrics range from 0.002" to 0.200" in thickness and can be tight or open woven. Most fabrics are "balanced," i.e., they have almost equal amounts of fibers in each direction, but some are "unidirectional" having most of the fibers in one direction.

Non-woven mattings are made of fiber strands laid in a random pattern. Various types are made, some with short lengths of fibers in a jack-straw pattern, some with swirls, continuous fibers, and some with fibers in a diamond type of pattern, in a variety of thicknesses. In order to hold the fibers together, a resinous binder can be employed. In some cases, the mats are stitched or needled, thus making the binder unnecessary.

Unidirectional reinforcements are continuous fibers in the form of yarns, rovings (which are untwisted, rope-like bundles of fibers), and beams (which are wide bands of parallel yarns). A variation of this is a non-woven matting, where the fibers are essentially parallel and are held together by a resin binder. These reinforcements are used where strengths are required in one direction only, as in a fishing rod. They give the highest strength of all reinforcements.

Rovings can also be chopped into short lengths for use in making pre-forms, which are random fiber mats of complex shape. Chopped strands are available for pre-forming also. Most often, however, the chopped strands and the shorter milled fibers are used for incorporation into moulding compounds, pre-mixed moulding putties, and potting compounds. Twisted strand is made according to conventional textile twisting techniques by removing the strand from the forming package and rewinding it.

Asbestos fibers are used in the form of woven fibers, felt, and papers. In some cases, combinations of asbestos and glass fibers are used.

The other types of fibers are not always considered to be true reinforcements because the strength they impart to the plastics is of a lower level than that of glass and asbestos. However, when intermediate strengths are satisfactory, they can be used. In this category are synthetic fibers such as nylon and rayon, and natural fibers such as cotton fabrics and paper. Cotton and paper reinforcements have been widely used for years for electrical and decorative panels. Sisal fibers are also a special case, because of their wide use as a low-strength reinforcement in pre-mixed moulding compounds.

Surfacing and overlay mats are a type of semi-reinforcement used to give a smoother surface to moulded articles of reinforced plastics. These are thin veils of fine glass, nylon, rayon, or other fibers that are placed over the regular fabric, mat, or pre-formed reinforcement. Alpha cellulose paper also is sometimes used in applications such as this, to retain a high surface content of resin for a glossy finish.

Flake reinforcements of glass or mica are also of significance. They impart some strength and much stiffness, and increase the vapor-transmission resistance of mouldings.

Significant problems occur in practice when reinforcement material is employed with polyepoxides. For example, in processes where the reinforcement material is impregnated with a resin-catalyst mixture, the resin-catalyst mixture generally must be prepared immediately prior to utilization to avoid premature hardening of the resin-catalyst system. In addition, it is often difficult to obtain effective bonding between the reinforcement material and the resin-catalyst system.

While there are at least 100 parameters that affect the chemical, electrical, thermal and durability characteristcs of reinforced polyepoxide products, the following three are considered to be of major importance:

(1) Choice of materials and process—particularly with respect to the reinforcement material, polyepoxide and curing agent;

(2) Curing conditions; and (3) Bond of polyepoxide to reinforcement material— governed by the surface treatment of the reinforcement material and the intimacy of contact.

SUMMARY OF THE INVENTION

It is an object of this invention to provide pre-catalyzed reinforcement material for use in polyepoxides.

It is another object of the invention to provide a treatment for reinforcement material wherein the treated material, which is capable of initiating the curing of epoxy resins, can be stored indefinitely.

An additional object of the invention is to provide a method of obtaining pre-catalyzed fibrous reinforcement material which can be twisted, plied, and woven into cloth for use in the reinforcement of a polyepoxide without requiring further catalytic activation of the cloth prior to use.

These, and other objects, are accomplished by the practice of this invention which, briefly, comprises the treatment of reinforcement material with an imidazole having the formula:

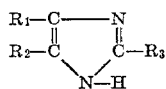

wherein $R_1$, $R_2$ and $R_3$ are independently selected from hydrogen, alkyl radicals of 1 to 19 carbon atoms, aryl hydrocarbon radicals of 6 to 14 carbon atoms and aralkyl hydrocarbon radicals of 7 to 16 carbon atoms, to provide a catalytically active surface which will cause the curing of a polyepoxide reinforced with the treated reinforcement material upon the application of heat.

DESCRIPTION OF PREFERRED EMBODIMENTS

Preferred imidazole compounds to be used in the process of the present invention include, among others: 2-methyl imidazole, 2-ethyl imidazole, 2 - ethyl-4-methyl imidazole, 4-butyl-5-ethyl imidazole, 2-dodecyl-5-methyl imidazole, 2,4,5-trimethyl imidazole, 2 - cyclohexyl-4-methyl imidazole, 2 - butoxy - 4 - allyl imidazole, 2-carboethoxy butyl - 4-methyl imidazole, 2 - octyl-4-hexyl imidazole, 2-ethyl-4-phenyl imidazole, 2,5-diphenyl imidazole, 2-benzyl imidazole, 2 - phenethyl imidazole and mixtures thereof. Especially preferred are liquid imidazoles and particularly the alkyl substituted imidazoles wherein the alkyl groups contain not more than 10 carbon atoms each, or mixtures thereof.

Polyepoxides which can be used in the present invention are those compounds possessing on the average more than one epoxy or oxirane group per molecule. The number of epoxy groups contained in the average molecule is obtained by dividing the average molecular weight of the polyepoxide by the polyepoxide equivalent weight. The polyepoxides can be saturated or unsaturated, aliphatic, aromatic or heterocyclic, monomeric or polymeric and, if desired, can be substituted with non-interfering substituents, such as halogen atoms, hydroxyl groups and ether radicals.

Preferred polyepoxide compounds are glycidyl ethers of polyhydric phenols, such as diphenylol alkanes, e.g., diphenylol propane, diphenylol ethane and diphenylol methane, diphenylol sulphone, hydroxyquinone resorcinol, dihydroxydiphenyl dihydroxynaphthalenes and polyhydric phenols, such as Novolacs and resols, which have been prepared by condensation of phenol and formaldehyde.

Glycidyl ethers of polyhydric phenols can be prepared in various ways, for example, by reaction of the polyhydric phenol with epichlorohydrin in the presence of a base, such as sodium hydroxide or potassium hydroxide. Important polyepoxy compounds are the glycidyl ethers of 2,2-bis(4-hydroxyphenyl)propane. The molecular weight, as well as the softening point and viscosity of such compounds, generally depend on the ratio of epichlorohydrin to 2,2-bis(4-hydroxyphenyl)propane. If a large excess of epichlorohydrin is used, e.g., 10 molecules of epichlorohydrin per molecule of 2,2-bis(4 - hydroxyphenyl)propane, the main component in the reaction product is a glycidyl ether of low molecular weight. In some instances, the polyethers can contain small amounts of material with a terminal glycidyl radical in hydrated form. Glycidyl polyethers of 2,2-bis(4-hydroxyphenyl)propane having a molecular weight between 340 and 4000 are preferred.

Other suitable polyepoxy compounds are poly(epoxyalkyl) ethers of aliphatic polyhydroxy compounds such as ethylene glycol, glycerol and trimethylolpropane; poly(epoxy alkyl) esters of polycarboxylic acids, such as the diglycidyl ester of phthalic acid, terephthalic acid and adipic acid, and polyglicidyl esters of polymer unsaturated fatty acids, such as diglycidyl ester of dimerized linoleic acids; epoxidized esters of unsaturated acids, such as epoxidized linseed oil or soybean oil; epoxidized dienes, such as diepoxy butane and epoxdized vinylcyclohexane; and di(epoxyalkyl)ethers in which two epoxy alkyl groups are connected by only one oxygen atom, such as diglycidyl ether.

Some commercially available epoxy resins and their characteristics are listed below:

| Resin: | Epoxide equivalent | Approximate molecular wt. | Viscosity |
|---|---|---|---|
| Epon 812 | 140–160 | 306 | 1–2 poises. |
| Epon 826 | 180–188 | | 65–95 poises. |
| Epon 828 | 185–192 | 390 | 100–160 poises. |
| Epon 834 | 230–280 | 470 | 4–9 poises. |
| Epon 1001 | 425–550 | 900 | Solid. |
| Dow 331 | 192 | 390 | |

Other epoxy resins which can be used include epoxidized polyolefins and epoxidized polybutadiene.

Various combinations of epoxy resins and phenol-aldehyde resins, urea-aldehyde resins, furfural resins, polyacetal resins, polycarbonate resins and polyamide resins can also be employed.

While the reinforcement material can be in a variety of forms, preferably the imidazole is applied as a liquid to reinforcement material in the form of individual filaments prior to the time they are grouped together to form a strand. Any convenient method of applying the imidazole to such filaments can be employed, e.g., by means of a bath, roller, brush or pad applicator. The imidazole immediately becomes permanently attached to the surface of the reinforcement material and produces the degree of strand integrity and hardness required for forming the strand into a woven cloth or woven roving. Preferably, the treated reinforcement material will contain between about 0.1 and 25 parts of imidazole per 100 parts of the polyepoxide subsequently employed.

The treated reinforcement material obtained by the initial imidazole reaction can be stored indefinitely. In addition, the treated material can be fabricated into the desired final product, including various textile products, such as twisted strand, cloth, chopped strand, chopped strand mat, roving and woven roving before or after application of the polyepoxide.

Following the addition of polyepoxide to the reinforcement material, the polyepoxide is cured merely by heating. The temperatures employed for curing can vary over a wide range. In general, temperatures ranging from 40° to 300° C. will give satisfactory results. Preferred temperatures range from 50° to 250° C.

Various additives can be included in the mixture before cure, such as solvents, diluents, dye, resins, plasticizers and non-volatile extenders. Suitable solvents include benzene, toluene, cyclohexane, ketones, ethers, esters, nitriles and the like. Monoepoxy diluents include butyl glycidyl ether, phenyl glycidyl ether and monoglycidyl esters and can generally be used in amounts of up to 20% by weight of the polyepoxide. Nonreactive, non-volatile extenders, such as coal tars, refined coal tars, coal tar pitches, asphalts, pine tar, pine oil, lube oil fractions and aromatic extracts thereof and lube oil raffinates can also be employed.

Other materials which can be included are pigments, stabilizers and reinforcing fillers, such as aluminum powder, zinc dust, and clay. These fillers are preferably used in amounts varying from 10 to 200 parts per 100 parts by weight of the polyepoxide.

The resinified products obtained by the above-identified process have surprisingly high heat-deflection temperature (HDT) and strength values at elevated temperatures. In addition, they display good resistance to boiling water as well as various solvents. These desirable properties make the process of particular value in the preparation of laminated articles and in filament winding applications.

In filament winding applications, pre-catalyzed reinforcement material can be passed into and through a bath containing the polyepoxide and then wound onto the desired mandrel or form and the formed unit allowed to cure by the application of heat. Since only moderately elevated temperatures are required for curing, curing can be accomplished in close proximity with heat-sensitive materials.

Pipe can also be made by centrifugal casting, where polyepoxide and pre-catalyzed reinforcement material are placed inside a rapidly revolving form and then cured. Rods and bars are made by pulling treated yarns or rovings through a polyepoxide bath and a forming die, followed by curing.

In the preparation of laminates, polyepoxide can be applied to sheets of treated reinforcement material. The sheets are then superimposed and the assembly cured under heat and pressure. Preferably, the assembly is cured in a heated press under a pressure of up to 500 p.s.i.g. or more and a temperature of 100° to 300° C. In this manner, extremely strong laminates having resistance against heat as well as against the action of organic and corrosive solvents can be made.

The invention will be illustrated by the following specific examples, it being understood that there is no intention to be necessarily limited by any details thereof since variations can be made within the scope of the invention.

EXAMPLE I 2-ethyl-4-methyl imidazole was applied to glass fibers (1062–T–15 Fiberglas roving from Pittsburgh Plate Glass) by heating the 2-ethyl-4-methyl imidazole to 50° C. and impregnating the fibers with 0.300 gram of 2-ethyl-4-methyl imidazole per yard. The resulting pre-catalyzed Fiberglas material was then wound on a paper tube, placed in a polyethylene bag and stored at room temperature. The pre-catalyzed material did not have any tackiness problem.

After 20 days, the material was removed from the polyethylene bags and drawn through an Epon 826 bath at normal room temperature. In accordance with ASTM–D–2991, a Naval Ordnance Laboratory (NOL) ring specimen was prepared from the epoxy coated Fiberglas material. The ring specimen was then cured at 90° C., producing a high quality reinforced plastic sample.

EXAMPLE II

Following the procedure of Example I, NOL ring specimens (5.75" x 0.25" x 0.125") were prepared containing 10 phr. of 2-ethyl-4-methyl imidazole per 100 parts of Epon 826 after varying storage periods for the pre-catalyzed Fiberglas. In each instance, the resulting specimens were cured at 90° C. for two hours and then post-cured at 175° C. for four hours. Using the split disk method (ASTM–D–2290) a determination was made of the tensile strength of the specimens.

| Storage time of the pre-catalyzed material (days): | Tensile strength (p.s.i.) |
| --- | --- |
| 0 | 112,000 |
| 20 | 112,000 |
| 91 | 112,100 |

EXAMPLE III

Glass filaments emerging from orifices in an electrically heated, platinum alloy bushing containing molten glass are passed through a heated bath containing 2-methyl imidazole in a liquid state to apply 0.20 gram of 2-methyl imidazole per yard of glass filament. The individual, pre-catalyzed filaments are then grouped together to form a strand by means of a graphite guide and wound around a forming tube rotating at approximately 7500 r.p.m. to produce a strand traveling at approximately 12,000 to 15,000 feet per minute. The 2-methyl imidazole treated filaments are very stable and do not break although subject to high shear during application of the 2-methyl imidazole. The glass fiber strands wound on the forming tube are not tacky and can be stored indefinitely.

After 60 days, the strands are coated with polyepoxide by passing the strands through a bath containing Epon 828 to obtain 100 parts of polyepoxide for each 15 parts of imidazole. The epoxy coated strands are then wound onto a mandrel and the resulting product is cured for eight hours at 60° C. into a hard, infusible, insoluble product.

EXAMPLE IV

Twelve plies of 181 style glass fiber cloth are treated with liquid 2-heptadecyl-4-methyl imidazole. Polyepoxide, Dow 331, is then heated and applied to the treated cloth at a resin pick-up of 50% by weight. The initial imidazole treatment is sufficient to provide 2 phr. of 2-heptadecyl-4-methyl imidazole per 100 parts of the polyepoxide.

A laminate, having a nominal thickness of about 0.125", is prepared from the cloth by application of a pressure of 100 pounds per square inch for 30 minutes at 135° C. The material is then post-cured at 204° C. for 30 minutes to provide a laminate with excellent flexural strength.

Pre-catalyzed reinforcement material prepared in accordance with the present invention has no storage problem and is protected from the atmosphere. Moreover, the present invention improves the processability of the reinforcement material and provides greater product reliability.

Not only do the imidazoles of the present invention have a high effectiveness in the curing of epoxy resins, but they also have a relatively low order of toxicity which is of considerable importance to the trade. Aliphatic amines are skin irritants and can cause dermatitis. Further, they are capable of sensitizing some individuals so that even very brief exposure becomes toxic. Aromatic amines, while less irritating to the skin and less prone to cause skin sensitization responses, present a very serious hazard if acquired internally. Anhydride curing agents are considered capable of causing severe eye and skin irritation, even burns, depending on the severity of contact. Thus, the low volatility and low order of dermal and oral toxicity of the aforementioned imidazole compounds are distinct advantages over many of the commonly employed epoxy curing agents.

What is claimed is:
1. In the method of preparing reinforced polyepoxides wherein reinforcement material, curable epoxy resin and a heat-activable catalyst promoting curing of curable epoxy resin are combined and the combination cured by the application of heat, the improvement comprising: treating reinforcement material selected from the group consisting of glass fiber, boron, asbestos, nylon, polyethylene terephthalate, cotton, rayon, paper, sisal, and alpha cellulose paper with catalyst consisting of an imidazole having the formula

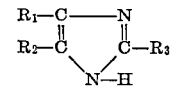

wherein $R_1$, $R_2$ and $R_3$ are independently selected from the group consisting of hydrogen, alkyl radicals of 1 to 19 carbon atoms, aryl hydrocarbon radicals of 6 to 14 carbon atoms and aralkyl hydrocarbon radicals of 7 to 16 carbon atoms, providing by said treating a catalytically active surface on said reinforcement material capable of promoting curing of epoxy resin, combining said treated reinforcement material and curable epoxy resin in a ratio to provide 0.1 to 25 parts of catalyst per hundred parts of resin, heating said combined treated reinforcement material and curable epoxy resin to heat-activate said catalytically active surface, and curing said combined treated reinforcement material and epoxy resin to reinforced polyepoxide.

2. The method of claim 1 wherein the reinforcement material is selected from the group consisting of glass, cotton, asbestos, nylon, rayon and boron.

3. The method of claim 1 wherein the polyepoxide applied to the imidazole treated reinforcement material is cured at a temperature of between 40° and 300° C.

4. The method of claim 3 wherein the polyepoxide is cured at a temperature of between 50° and 250° C.

5. In the method of preparing reinforced polyepoxides wherein reinforcement material, curable epoxy resin possessing on the average more than one epoxy or oxirane group per molecule, and a catalyst capable of promoting the curing of curable epoxy resin are combined and the combination cured by the application of heat, the improvement comprising:

(a) providing individual filaments selected from the group consisting of glass fiber, boron, asbestos, nylon, polyethylene terephthalate, cotton, rayon, paper, sisal, and alpha cellulose paper, said filaments being capable of fabrication to reinforcement material for reinforced polyepoxides;

(b) applying as a liquid a surface coating to said individual filaments an epoxy resin cure promoting catalyst activable by heat, said catalyst consisting of an imidazole having the formula

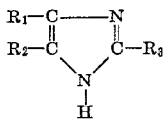

wherein $R_1$, $R_2$ and $R_3$ are independently selected from the group consisting of hydrogen, alkyl radicals of 1 to 19 carbon atoms, aryl hydrocarbon radicals of 6 to 14 carbon atoms and aralkyl hydrocarbon radicals of 7 to 16 carbon atoms;

(c) fabricating said catalyst coated filaments to form reinforcement material suitable for combination with curable epoxy resin in the preparation of reinforced polyepoxides;

(d) combining said fabricated reinforcement material with curable epoxy resin, said epoxy resin being combined in an amount such that 100 parts thereof are present for an amount of the catalyst as the catalyst surface coating on the individual filaments comprising said fabricated reinforcement material in the range of 0.1 to .25 parts; and (e) curing said combination at a temperature in the range of 40–300° C. to reinforced polyepoxide.

6. The method in accordance with claim 5 wherein said filaments are glass fiber and said curing is effected at an elevated pressure below 500 pounds per square inch.

References Cited

UNITED STATES PATENTS

| | | | |
|---|---|---|---|
| 2,794,754 | 6/1957 | Schroeder | 117—139.4 |
| 3,030,376 | 4/1962 | Liggett et al. | 260—309 |
| 3,119,711 | 1/1964 | Starmann et al. | 117—161 X |
| 3,122,569 | 2/1964 | Kaman | 117—161 X |
| 3,135,720 | 6/1964 | Batzer et al. | 117—62.2 X |
| 3,242,244 | 3/1966 | Maly | 117—62.2 X |
| 3,356,645 | 12/1967 | Warren | 260—2 X |
| 3,390,007 | 6/1968 | Bonner et al. | 117—161 X |
| 3,394,105 | 7/1968 | Christie | 260—2 X |
| 3,401,146 | 9/1968 | Kamal et al. | 117—161 X |
| 3,409,592 | 11/1968 | Landua et al. | 117—161 X |

WILLIAM D. MARTIN, Primary Examiner

M. R. LUSIGNAN, Assistant Examiner

U.S. Cl. X.R.

117—54, 56, 60, 161